No. 645,812. Patented Mar. 20, 1900.
C. W. HOFFMAN.
DUMB WAITER.
(Application filed Dec. 6, 1899.)
(No Model.)
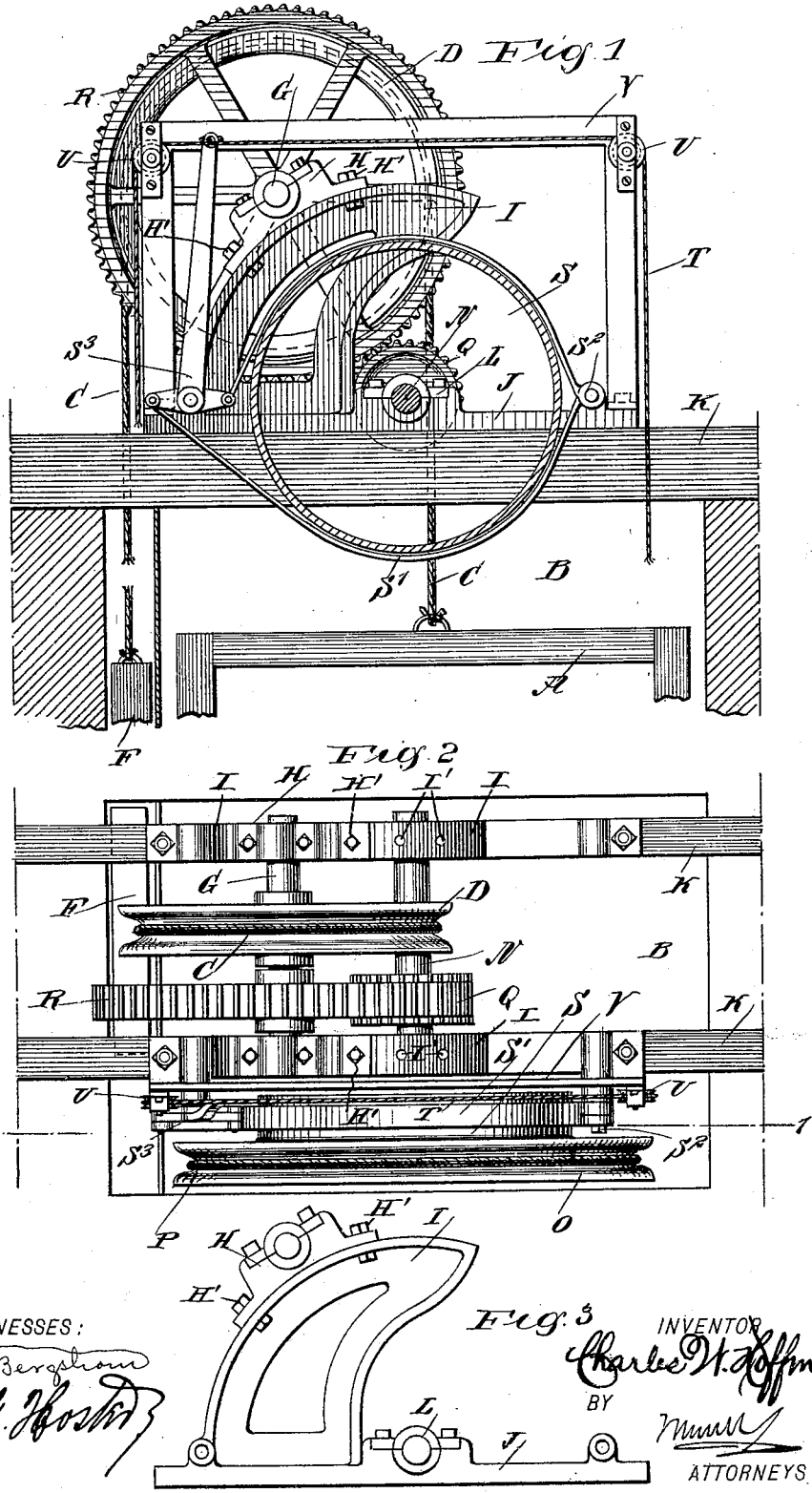
WITNESSES:
INVENTOR
Charles W. Hoffman
BY
ATTORNEYS

UNITED STATES PATENT OFFICE.

CHARLES W. HOFFMAN, OF NEW YORK, N. Y.

DUMB-WAITER.

SPECIFICATION forming part of Letters Patent No. 645,812, dated March 20, 1900.

Application filed December 6, 1899. Serial No. 739,394. (No model.)

*To all whom it may concern:*

Be it known that I, CHARLES W. HOFFMAN, a citizen of the United States, and a resident of the city of New York, borough of Manhattan, in the county and State of New York, have invented certain new and useful Improvements in Dumb-Waiters, of which the following is a full, clear, and exact description.

The object of the invention is to provide certain new and useful improvements in dumb-waiters and elevators, whereby the manufacturer is enabled to readily change the cage-supporting rope-pulley to suit the width of the well or shaft and to bring the runs of said rope in proper alinement with the cage and the counterbalancing-weight without the use of extra guide-pulleys, the arrangement also affording a convenient and simple support for the brake mechanism of the hoisting-drum.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of the improvement on the line 1 1 in Fig. 2. Fig. 2 is a plan view of the same, and Fig. 3 is a side elevation of the supporting-frame.

The cage or box A is mounted to ascend and descend in the shaft or well B and is hung at the middle of its top on one end of a rope C, extending over a pulley D and connected at its other end with a counterbalancing-weight F, held to rise and fall in the well B at one side of the cage and close to the wall of the well, as is plainly indicated in Fig. 1. The pulley D is secured on a shaft G, journaled in bearings H, held on segmental supports I, forming part of the frame J, attached to supporting-beams K, arranged on the upper end of the shaft or well B in the usual manner and as indicated in the drawings. On the frame J are also arranged bearings L for a shaft N, carrying on one outer end a working pulley O, over which extends a working rope P, adapted to be taken hold of by the operator on either of its runs to turn the pulley O in either a forward or reverse direction and hoist or lower the cage A in the usual manner. For this purpose the shaft N is provided with a pinion Q in mesh with a gear-wheel R, secured on the shaft G, before mentioned, so that when the pulley O is rotated, and with it the shaft N and pinion Q, then the gear-wheel R is revolved, and with it the shaft G and pulley D, to cause the rope C to raise or lower the cage A, according to the direction in which the pulley O is turned by the operator manipulating the rope P. The bearings H are secured by bolts H' to the segmental rims of the supports I, the said bolts H' engaging sets of apertures I' formed in the said rims. In practice the bearings H are temporarily placed in the proper position on the rims of the supports and the bolt-holes for the rims are marked off through the bolt-holes in the bearings H and then the bolt-holes I' are drilled as marked off and the bearings are replaced in position on the rims and then secured in place thereon by the bolts. A series of spaced bolt-holes I' may, however, be formed in each of the rims, as shown in Fig. 2, and the bolts H' of the bearings H inserted in the nearest bolt-holes I' after the bearings are adjusted on the rims. Each of the segmental supports I has its center coinciding with the axis of the shaft N and bearings L, so that the bearings H can be shifted on the said support I without moving the gear-wheel R and the pinion Q out of mesh, at the same time, however, permitting the use of a large or small pulley D on the same shaft G, according to the width of the well B, so that the runs of the rope C extend vertically downward, the rope connecting at one end with the middle portion of the top of the cage A and at the other end with the weight F without the use of guide-pulleys or other devices. Thus by the arrangement described the manufacturer is enabled to use the same construction for different-sized wells, it being only necessary to select a pulley D of such diameter as to bring the runs of the rope C into proper position relatively to the cage A and the counterbalancing-weight F. Thus no additional guide-pulleys for the rope C are necessary, and consequently undue friction is completely avoided, and the cage A and the counterbalancing-weight F are properly hung to move up or down in the well without danger of binding, and consequently less power is required to raise or lower the load.

In order to brake the hoisting apparatus in case of an overload to be lowered, the following device is provided: On the inside of the pulley O is secured or formed a brake-wheel S, engaged by a brake-band S', made in the usual two parts, fulcrumed at one end of a pin S², carried by the frame J, the other end of the band being connected with the usual three-armed lever S³, connected by a rope T, extending over the pulleys U, journaled on an auxiliary frame V, attached to the main frame J, the runs of the rope T reaching down in the well to be within convenient reach of the operator. It is expressly understood that the pinion Q and the gear-wheel R remain the same, no matter to what position the bearings H are shifted to accommodate a smaller or larger pulley D, according to the size of the shaft, as the segmental support I has its center in the axis of the shaft N and bearings L. From the foregoing it is also understood that the frame J forms a ready support for the pin S² of the brake-band S' and for the pivot of the lever S³, and at the same time the frame J also forms a supporting means for the auxiliary frame V to permit of constructing the entire device in a very simple and cheap manner and at the same time increase the efficiency of the apparatus.

It is understood that although the device is shown as applied to a dumb-waiter it may be equally well used to advantage on other elevators.

Having thus fully described my invention, I claim as new and desire to secure by Letters Patent—

1. A dumb-waiter or elevator frame having a set of alined fixed bearings, supports having segmental rims, the centers of which coincide with the axis of the said fixed bearings, a second set of bearings resting on said segmental rims, to maintain the same relative distance between the axes of the two sets of bearings upon shifting the second set of bearings on the segmental rims, and bolts for fastening said second set of bearings to the said rims, substantially as shown and described.

2. A dumb-waiter or elevator frame having a set of alined fixed bearings, supports having segmental rims, the centers of which coincide with the axis of said fixed bearings, a second set of bearings resting on the said segmental rims to maintain the same relative distance between the axes of the two sets of bearings upon shifting the second set of bearings on the segmental rims, bolts for securing the second set of bearings in place on the rims, a brake-band attached to the said frame, and a brake-lever for the said brake-band and pivoted on the said frame, substantially as shown and described.

3. A dumb-waiter, comprising a frame having a set of alined fixed bearings for the driving-shaft, supports forming part of the frame and having segmental rims, the centers of which coincide with the axes of the said bearings, a second set of bearings for the driven shaft and secured to the said rims, a driving-shaft journaled in said driving-shaft bearings and carrying the usual working pulley, a pinion on the said driving-shaft, a gear-wheel in mesh with the said pinion, a driven shaft journaled in the bearings on the said rims, and carrying said gear-wheel, and a rope-pulley on said driven shaft, for carrying the rope connected with the cage and the counterbalancing-weight, the runs of said rope extending vertically from the pulley, to directly connect with the cage and the counterbalancing-weight, substantially as shown and described.

4. A dumb-waiter, comprising a frame having a set of alined fixed bearings for the driving-shaft, supports forming part of the frame and having segmental rims, the centers of which coincide with the axes of the said bearings, a second set of bearings for the driven shaft and secured to said rims, a driving-shaft journaled in said driving-shaft bearings and carrying the usual working pulley, a pinion on the said driving-shaft, a gear-wheel in mesh with the said pinion, a driven shaft journaled in the bearings on the said rims, and carrying said gear-wheel, a rope-pulley on said driven shaft, for carrying the rope connected with the cage and the counterbalancing-weight, the runs of said rope extending vertically from the pulley, to directly connect with the cage and the counterbalancing-weight, a brake-band wheel forming part of the working pulley, a brake-band for engagement with said brake-band wheel and attached to the fixed frame, and a brake-lever fulcrumed on the said frame and engaging the said brake-band for operating the latter, substantially as shown and described.

In testimony whereof I have signed my name to this specification in the presence of two subscribing witnesses.

CHARLES W. HOFFMAN.

Witnesses:
 THEO. G. HOSTER,
 EVERARD BOLTON MARSHALL.